(12) United States Patent
Wu

(10) Patent No.: US 9,036,115 B2
(45) Date of Patent: May 19, 2015

(54) LIQUID CRYSTAL DISPLAY MODULE

(71) Applicant: TIANJIN FUNAYUANCHUANG TECHNOLOGY CO.,LTD., Tianjin (CN)

(72) Inventor: Ho-Chien Wu, Hsinchu (TW)

(73) Assignee: TIANJIN FUNAYUANCHUANG TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 13/869,959

(22) Filed: Apr. 25, 2013

(65) Prior Publication Data

US 2014/0022497 A1 Jan. 23, 2014

(30) Foreign Application Priority Data

Jul. 23, 2012 (CN) .......................... 2012 1 02551372

(51) Int. Cl.
*G02F 1/1335* (2006.01)
*G02F 1/1333* (2006.01)
*B82B 1/00* (2006.01)

(52) U.S. Cl.
CPC ......... *G02F 1/13338* (2013.01); *Y10S 977/742* (2013.01); *B82B 1/00* (2013.01); *Y10S 977/842* (2013.01)

(58) Field of Classification Search
CPC .................................. H01L 21/00; G06F 3/00
USPC ............ 349/96, 2, 139; 977/742, 842; 438/30
See application file for complete search history.

(56) References Cited

U.S. PATENT DOCUMENTS

| | | | | |
|---|---|---|---|---|
| 8,125,878 B2* | 2/2012 | Jiang et al. | ..................... | 369/173 |
| 8,199,119 B2* | 6/2012 | Jiang et al. | ..................... | 345/173 |
| 8,237,669 B2* | 8/2012 | Jiang et al. | ..................... | 345/173 |
| 8,237,671 B2* | 8/2012 | Jiang et al. | ..................... | 345/173 |
| 8,237,675 B2* | 8/2012 | Jiang et al. | ..................... | 345/173 |
| 8,242,670 B2* | 8/2012 | Kim et al. | ..................... | 313/112 |
| 8,243,029 B2* | 8/2012 | Jiang et al. | ..................... | 345/173 |
| 8,248,381 B2* | 8/2012 | Jiang et al. | ..................... | 345/173 |
| 8,253,700 B2* | 8/2012 | Jiang et al. | ..................... | 345/173 |
| 8,253,701 B2* | 8/2012 | Liu et al. | ......................... | 345/173 |
| 8,253,870 B2* | 8/2012 | Qian et al. | ........................ | 349/12 |
| 8,260,378 B2* | 9/2012 | Jiang et al. | ................. | 455/575.1 |
| 8,325,585 B2* | 12/2012 | Jiang et al. | ..................... | 369/173 |
| 8,346,316 B2* | 1/2013 | Jiang et al. | ................. | 455/575.1 |
| 8,411,044 B2* | 4/2013 | Liu et al. | ......................... | 345/173 |
| 8,416,351 B2* | 4/2013 | Liu et al. | ......................... | 349/12 |
| 8,587,733 B2* | 11/2013 | Liu et al. | ......................... | 349/12 |
| 2004/0218132 A1* | 11/2004 | Song et al. | ..................... | 349/145 |
| 2005/0253990 A1* | 11/2005 | Song et al. | ..................... | 349/145 |
| 2009/0153502 A1* | 6/2009 | Jiang et al. | ..................... | 345/173 |
| 2009/0153504 A1* | 6/2009 | Liu et al. | ......................... | 345/173 |
| 2009/0153507 A1* | 6/2009 | Jiang et al. | ..................... | 345/173 |
| 2009/0153509 A1* | 6/2009 | Jiang et al. | ..................... | 345/173 |
| 2009/0153511 A1* | 6/2009 | Jiang et al. | ..................... | 345/173 |
| 2009/0153513 A1* | 6/2009 | Liu et al. | ......................... | 345/173 |
| 2009/0153514 A1* | 6/2009 | Jiang et al. | ..................... | 345/173 |

(Continued)

*Primary Examiner* — Telly Green
(74) *Attorney, Agent, or Firm* — Novak Druce Connolly Bove + Quigg LLP

(57) ABSTRACT

A liquid crystal display module includes a liquid crystal module and a polarizer stacked with each other. The polarizer includes a polarizing layer, a transparent conductive layer and at least two driving-sensing electrodes. The polarizing layer and the transparent conductive layer are stacked with each other. The at least two driving-sensing electrodes are spaced from each other and electrically connected with the transparent conductive layer.

18 Claims, 7 Drawing Sheets

(56) References Cited

U.S. PATENT DOCUMENTS

| | | | |
|---|---|---|---|
| 2009/0153515 A1* | 6/2009 | Jiang et al. | 345/173 |
| 2009/0153521 A1* | 6/2009 | Jiang et al. | 345/174 |
| 2009/0167708 A1* | 7/2009 | Jiang et al. | 345/173 |
| 2009/0167710 A1* | 7/2009 | Jiang et al. | 345/173 |
| 2010/0048250 A1* | 2/2010 | Jiang et al. | 455/566 |
| 2010/0048254 A1* | 2/2010 | Jiang et al. | 455/566 |
| 2010/0073322 A1* | 3/2010 | Jiang et al. | 345/174 |
| 2010/0215985 A1* | 8/2010 | Kitano | 428/688 |
| 2010/0315374 A1* | 12/2010 | Chen et al. | 345/174 |
| 2010/0317409 A1* | 12/2010 | Jiang et al. | 455/566 |
| 2010/0323186 A1* | 12/2010 | Maruyama | 428/323 |
| 2011/0025645 A1* | 2/2011 | Mata et al. | 345/174 |
| 2011/0032196 A1* | 2/2011 | Feng et al. | 345/173 |
| 2011/0115740 A1* | 5/2011 | Qian et al. | 345/174 |
| 2011/0171419 A1* | 7/2011 | Li et al. | 428/113 |
| 2011/0204300 A1* | 8/2011 | Kitano | 252/519.3 |
| 2011/0242046 A1* | 10/2011 | Feng et al. | 345/174 |
| 2011/0292311 A1* | 12/2011 | Qian et al. | 349/38 |
| 2011/0299015 A1* | 12/2011 | Liu et al. | 349/96 |
| 2011/0304800 A1* | 12/2011 | Liu et al. | 349/96 |
| 2013/0127776 A1* | 5/2013 | Guard et al. | 345/174 |
| 2013/0314648 A1* | 11/2013 | Rappoport et al. | 349/96 |

\* cited by examiner

LIQUID CRYSTAL DISPLAY MODULE

CROSS-REFERENCE TO RELATED APPLICATIONS

This application claims all benefits accruing under 35 U.S.C. §119 from China Patent Application No. 201210255137.2, filed on Jul. 23, 2012, in the China Intellectual Property Office, the disclosure of which is incorporated herein by reference. The application is also related to copending application entitled, "LIQUID CRYSTAL DISPLAY MODULE", filed Apr. 25, 2013 Ser. No. 13/869,958; "METHOD FOR MAKING LIQUID CRYSTAL DISPLAY MODULE", filed Apr. 25, 2013 Ser. No. 13/869,961; AND "METHOD FOR MAKING LIQUID CRYSTAL DISPLAY MODULE", filed Apr. 25, 2013 Ser. No. 13/869,964; "LIQUID CRYSTAL DISPLAY MODULE", U.S. application Ser. No. 13/837,266, filed Mar. 15, 2013, and "LIQUID CRYSTAL DISPLAY MODULE", U.S. application Ser. No. 13/837,359 filed Mar. 15, 2013; "POLARIZER", U.S. application Ser. No. 13/730,711, filed Dec. 28, 2012; "POLARIZER", U.S. application Ser. No. 13/730,884, filed Dec. 29, 2012.

BACKGROUND

1. Technical Field

The present disclosure relates to liquid crystal display module, particularly to a liquid crystal display module with touch sensing capability.

2. Description of Related Art

A conventional liquid crystal display module for a liquid crystal display (LCD), according to the prior art, generally includes a first polarizer, a thin film transistor panel, a first alignment layer, a liquid crystal layer, a second alignment layer, a common electrode layer (e.g., an indium tin oxide (ITO) layer), an upper board, and a second polarizer. The TFT panel includes a plurality of pixel electrodes. The polarizing directions of the first and second polarizer are perpendicular to each other. When a voltage is applied between the pixel electrode and the common electrode layer, the liquid crystal molecules in the liquid crystal layer between the first alignment layer and the second alignment layer align along a same direction to make the light beams polarized by the first polarizer irradiate on the second polarizer directly without rotation. The polarized light beams cannot pass through the first polarizer. Without a voltage applied to the pixel electrode and the common electrode layer, the polarized light beams rotated by the liquid crystal molecules can pass through the second polarizer. Selectively applying voltages between different pixel electrodes and the common electrode layer can control the on and off of different pixels, thus displaying images.

A conventional polarizing layer is made by using a transparent polymer film (e.g., PVA film) to absorb the dichroism material, and the dichroism material. The dichroism material is infiltrated into the transparent polymer film, and the transparent polymer film aligns with the dichroism material in one direction. In addition to the polarizing layer, the conventional polarizer also includes protective layers, adhesive layer, separating layer covered on two opposite surfaces of the polarizing layer. During the manufacturing of the liquid crystal display screen, the second polarizer is directly attached to a top surface of the upper board.

In recent years, there is continuous growth in the number of electronic apparatuses equipped with optically transparent touch panels in front of their respective display devices (e.g., liquid crystal display screen). The touch panel is commonly attached to the top surface of the second polarizer. However, this arrangement will increase a thickness of the electronic apparatuses. Further, the touch panel and the second polarizer are individually manufactured and assembled, which increases the complexity of the manufacturing process, and increases the cost for production.

What is needed, therefore, is to provide a LCD module for solving the problem discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
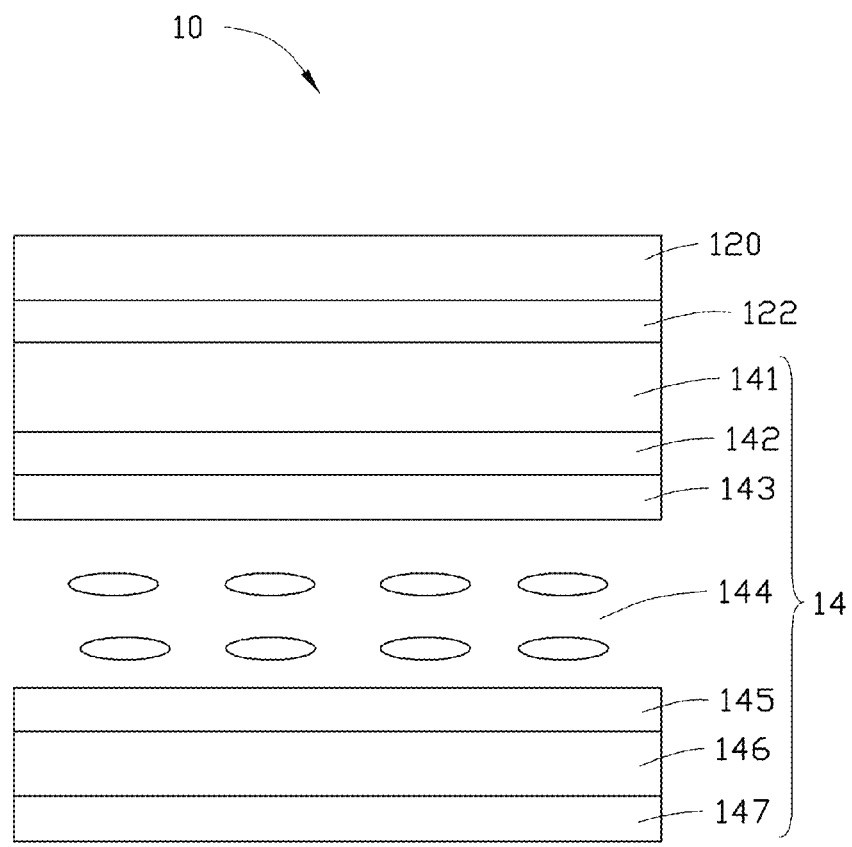
FIG. 1 is a schematic cross-sectional view of an embodiment of a LCD module.
Figure 2:
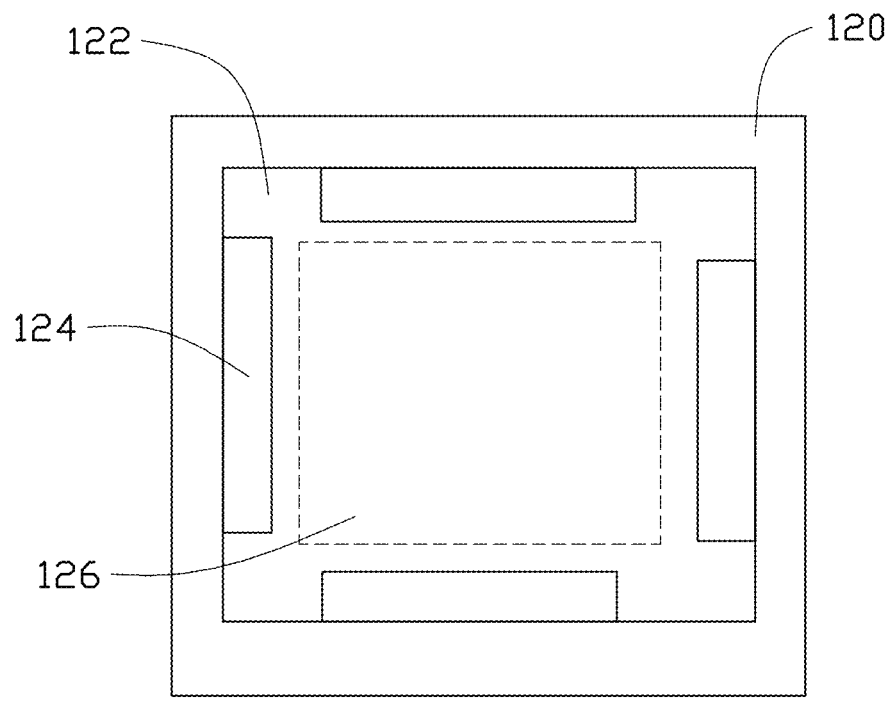
FIG. 2 is a schematic view of an embodiment of a polarizer in the LCD module of FIG. 1.

Referring to FIG. 1 and FIG. 2, one embodiment of a liquid crystal display (LCD) module 10 includes a polarizer 12 and a liquid crystal module 14 disposed on a surface of the polarizer 12. The polarizer 12 is capable of sensing touches, occurred thereon, and polarizing light. The polarizer 12 is an integral structure which can be independent and free installation and disassembling.

The polarizer 12 includes a first polarizing layer 120, a transparent conductive layer 122, and at least two driving-sensing electrodes 124. The first polarizing layer 120 and the transparent conductive layer 122 are stack with other. The at least two driving-sensing electrodes 124 are spaced from each other and electrically connected with the transparent conductive layer 122.

The first polarizing layer 120 can be an insulating material layer having a light polarizing function. More specifically, the first polarizing layer 120 includes a transparent polymer film (e.g., PVA film) and a dichroism material infiltrated in the transparent polymer film. The dichroism material can be iodoquinine sulfate. The molecules of the dichroism material can align along the same direction.

The at least two driving-sensing electrodes 124 are spaced from each other and can be disposed on a surface of the transparent conductive layer 122 away from the first polarizing layer 120. In one embodiment, the transparent conductive layer 122 has a square shape having four sides, the polarizer 12 includes four driving-sensing electrodes 124, and each one of the four sides is disposed one driving-sensing electrode 124. In one embodiment, four driving-sensing electrodes 124 are separately disposed on corners of the transparent conductive layer 122. The at least two driving-sensing electrodes 124 can be made of at least one material of a metal, a conductive polymer, and a carbon nanotube layer including a plurality of carbon nanotubes. The at least two driving-sensing electrodes 124 can be formed by screen printing, sputtering, evaporating, or coating methods. The transparent conductive layer 122 and the at least two driving-sensing electrodes 124 cooperatively form a touch control module.

The transparent conductive layer 122 can be directly in contact with a surface of the first polarizing layer 120. In one embodiment, the transparent conductive layer 122 includes a carbon nanotube film comprising a plurality of carbon nanotubes orderly arranged. The plurality of carbon nanotubes are substantially aligned along a same direction so that the carbon nanotube film has a maximum electrical conductivity at the aligned direction of the carbon nanotubes which is greater than at other directions.

The carbon nanotube film can be formed by drawing the film from a carbon nanotube array. The overall aligned direction of a majority of the carbon nanotubes in the carbon nanotube film is substantially aligned along the same direction and parallel to a surface of the carbon nanotube film. The carbon nanotube is joined to adjacent carbon nanotubes end to end by van der Waals force therebetween, and the carbon nanotube film is capable of being a free-standing structure. A support having a large surface area to support the entire free-standing carbon nanotube film is not necessary, and only a supportive force at opposite sides of the film is sufficient. The free-standing carbon nanotube film can be suspended and maintain its own film state with only supports at the opposite sides of the film. When disposing (or fixing) the carbon nanotube film between two spaced supports, the carbon nanotube film between the two supports can be suspended while maintaining its integrity. The successively and aligned carbon nanotubes joined end to end by van der Waals attractive force in the carbon nanotube film is the main reason for the free-standing property. The carbon nanotube film drawn from the carbon nanotube array has a good transparency. In one embodiment, the carbon nanotube film is substantially a pure film and consists essentially of the carbon nanotubes, and to increase the transparency of the touch panel, the carbon nanotubes are not functionalized. The free-standing carbon nanotube film can be directly attached to the surface of the first polarizing layer 120.

Figure 3:
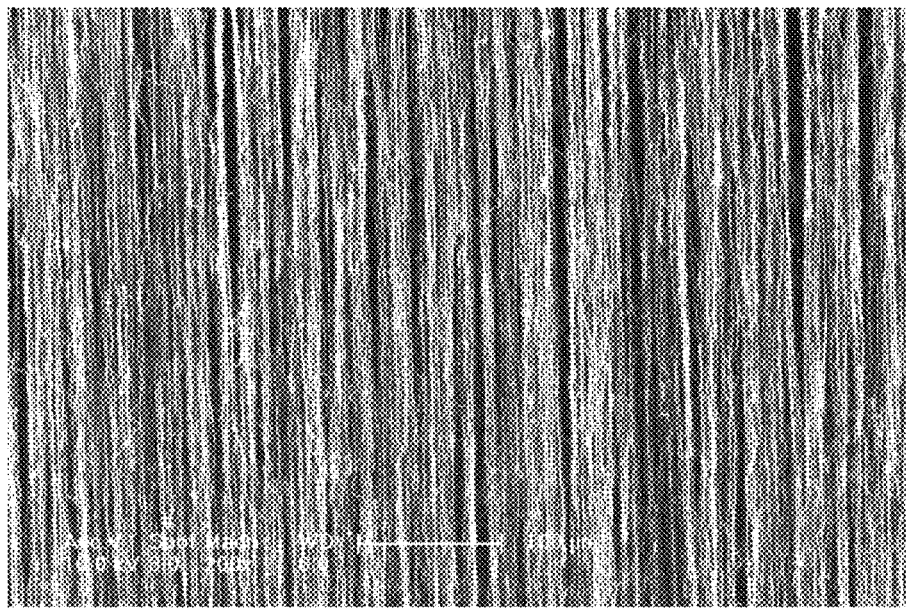
FIG. 3 shows a scanning electron microscope image of a carbon nanotube film.

Referring to FIG. 3, the plurality of carbon nanotubes in the carbon nanotube film have a preferred orientation along the same direction. The preferred orientation means that the overall aligned direction of the majority of carbon nanotubes in the carbon nanotube film is substantially along the same direction. The overall aligned direction of the majority of carbon nanotubes is substantially parallel to the surface of the carbon nanotube film, thus parallel to the surface of the polarizing layer. Furthermore, the majority of carbon nanotubes are joined end to end therebetween by van der Waals force. In this embodiment, the majority of carbon nanotubes are substantially aligned along the same direction in the carbon nanotube film, with each carbon nanotube joined to adjacent carbon nanotubes at the aligned direction of the carbon nanotubes end to end by van der Waals force. There may be a minority of carbon nanotubes in the carbon nanotube film that are randomly aligned, but the number of randomly aligned carbon nanotubes is very small compared to the majority of substantially aligned carbon nanotubes and therefore will not affect the overall oriented alignment of the majority of carbon nanotubes in the carbon nanotube film.

In the carbon nanotube film, the majority of carbon nanotubes that are substantially aligned along the same direction may not be completely straight. Sometimes, the carbon nanotubes can be curved or not exactly aligned along the overall aligned direction, and can deviate from the overall aligned direction by a certain degree. Therefore, it cannot be excluded that partial contacts may exist between the juxtaposed carbon nanotubes in the majority of carbon nanotubes aligned along the same direction in the carbon nanotube film. Despite having curved portions, the overall alignment of the majority of the carbon nanotubes are substantially aligned along the same direction.

Figure 4:
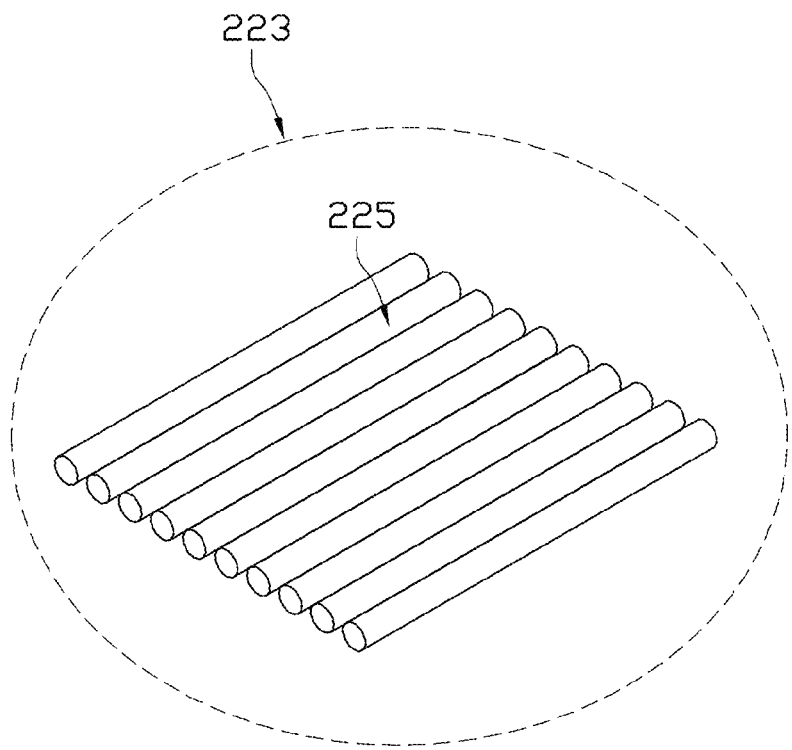
FIG. 4 is a schematic view of a carbon nanotube segment of the carbon nanotube film.

Referring to FIG. 4, the carbon nanotube film includes a plurality of successive and oriented carbon nanotube segments 223. The plurality of carbon nanotube segments 223 are joined end to end by van der Waals attractive force. Each carbon nanotube segment 223 includes a plurality of carbon nanotubes 225 that are substantially parallel to each other, and the plurality of parallel carbon nanotubes 225 are in contact with each other and combined by van der Waals attractive force therebetween. The carbon nanotube segment 223 can have a desired length, thickness, uniformity, and shape. The carbon nanotubes 225 in the carbon nanotube film have a preferred orientation along the same direction. The carbon nanotube wires in the carbon nanotube film can consist of a plurality of carbon nanotubes joined end to end. The adjacent and juxtaposed carbon nanotube wires can be connected by the randomly aligned carbon nanotubes. There can be clearances between adjacent and juxtaposed carbon nanotubes in the carbon nanotube film. A thickness of the carbon nanotube film at the thickest location is about 0.5 nanometers to about 100 microns (e.g., in a range from 0.5 nanometers to about 10 microns).

A method for drawing the carbon nanotube film from the carbon nanotube array includes: (a) selecting a carbon nanotube segment 223 from a carbon nanotube array using a drawing tool, such as an adhesive tape or adhesive substrate bar contacting the carbon nanotube array, to select the carbon nanotube segment 223; and (b) moving the drawing tool and drawing the selected carbon nanotube segment 223 at a certain speed, such that a plurality of carbon nanotube segments 223 are drawn joined end to end, thereby forming a successive carbon nanotube film. The plurality of carbon nanotubes of the carbon nanotube segment 223 are juxtaposed to each other. While the selected carbon nanotube segment 223 gradually separates from the growing substrate of the carbon nanotube array along the drawing direction under the drawing force, the other carbon nanotube segments 223 that are adjacent to the selected carbon nanotube segment 223 are successively drawn out end to end under the action of the van der Waals force, thus forming a successive and uniform carbon nanotube film having a width and preferred orientation.

The carbon nanotube film has a unique impedance property because the carbon nanotube film has a minimum electrical impedance in the drawing direction, and a maximum electrical impedance in the direction perpendicular to the drawing direction, thus the carbon nanotube film has an anisotropic impedance property. A relatively low impedance direction D is the direction substantially parallel to the aligned direction of the carbon nanotubes, and a relatively high impedance direction H is substantially perpendicular to the aligned direction of the carbon nanotubes. The carbon nanotube film can have a square shape with four sides. Two sides are opposite to each other and substantially parallel to the relatively high impedance direction H. The other two sides are opposite to each other and substantially parallel to the relatively low impedance direction D. In one embodiment, a ratio between the impedance at the relatively high impedance direction H and the impedance at the relatively low impedance direction D of the carbon nanotube film is equal to or greater than 50 (e.g., in a range from 70 to 500). The at least two driving-sensing electrodes 124 can be disposed on and electrically connected with the two opposite sides of the carbon nanotube film which are perpendicular to relatively low impedance direction D. In other words, the majority of carbon nanotubes in the carbon nanotube films extends from one of the at least two driving-sensing electrodes 124 to the other one of the at least two driving-sensing electrodes 124.

The transparent conductive layer 122 can include a plurality of carbon nanotube films laminated to each other or arranged side to side. The carbon nanotubes in the plurality of carbon nanotube films can be aligned along the same direction and extend from one of the at least two driving-sensing electrodes 124 to the other one of the at least two driving-sensing electrodes 124. In one embodiment, the transparent conductive layer 122 includes a plurality of carbon nanotube films overlapped with each other and aligned directions of the carbon nanotubes in adjacent carbon nanotube films are substantially perpendicular to each other. In other words, some carbon nanotubes are aligned along a first direction and the other carbon nanotubes are aligned along a second direction, that is perpendicular to the first direction. In this situation, the polarizer 12 includes four driving-sensing electrodes 124, two driving-sensing electrodes 124 are disposed on and electrically connected with two opposite sides of the transparent conductive layer 122 parallel to the first direction and the other two driving-sensing electrodes 124 are disposed on and electrically connected with two opposite sides of the transparent conductive layer 122 parallel to the second direction. The carbon nanotube film can have a transmittance of visible light above 85%.

The transparent conductive layer 122 also can be a carbon nanotube composite film. The carbon nanotube composite film includes the carbon nanotube film and a polymer material infiltrating the carbon nanotube film. Spaces can exist between adjacent carbon nanotubes in the carbon nanotube film and thus the carbon nanotube film defines a number of micropores by the adjacent carbon nanotubes. The polymer material is filled into the number of micropores of the carbon nanotube film to form the carbon nanotube composite film. The polymer material can be distributed uniformly in the carbon nanotube composite film. The polymer material can be polystyrene, polyethylene, polycarbonate, polymethyl methacrylate (PMMA), polycarbonate (PC), polyethylene terephthalate (PET), benzocyclobutene (BCB), or polyalkenamer. In one embodiment, the polymer material is PMMA. The carbon nanotube composite film can include one or more carbon nanotube films. The carbon nanotube composite film can have a uniform thickness. A thickness of the carbon nanotube composite film is only limited by the degree of transparency desired. In one embodiment, the thickness of the carbon nanotube composite film can range from about 0.5 nanometers to about 100 microns.

The polarizer 12 can further include a conducting wire (not shown), to electrically connect the driving-sensing electrodes 124 to an outer circuit. The conducting wire can be arranged around the transparent conductive layer 122 with the driving-sensing electrodes 124.

In one embodiment, the polarizer 12 includes the four bar shaped driving-sensing electrodes 124 separately disposed on four sides of the transparent conductive layer 122. In use, a voltage is applied to the transparent conductive layer 122 via the four driving-sensing electrodes 124 to form an equipotential surface. When the surface of the polarizer 12 is contacted via hands or touch pens, a coupling capacitance is formed between the touching material and the transparent conductive layer 122. The current then flows from the four driving-sensing electrodes 124 to the touching point. The position of the touching point is confirmed via calculating the ratio and the intensity of the current through the electrodes.

Figure 5:
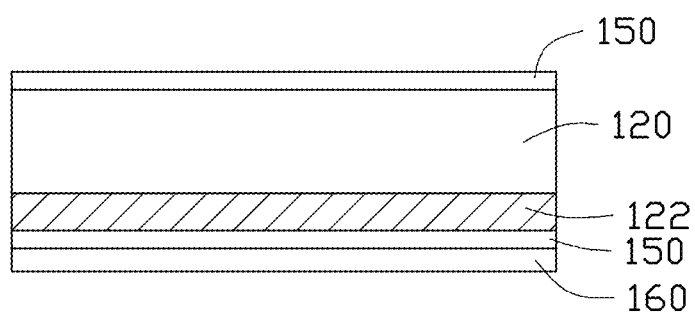
FIG. 5 is a side view of another embodiment of a polarizer.

Referring to FIG. 5, the polarizer 12 can further include at least one of a protective layer 150, and an adhesive layer 160. The protective layer 150 is used to protect the first polarizing layer 120 and the transparent conductive layer 122. The adhesive layer 160 is used to combine the polarizer 12 with the liquid crystal module 14. The material of the protective layer 150 can be at least one of triacetyl cellulose (TAC), polystyrene, polyethylene, polyethylene terephthalate (PET), poly (methyl methacrylate) (PMMA), polycarbonate (PC), and benzocyclobutene (BCB). The material of the adhesive layer 160 can be UV adhesive, pressure sensitive adhesive, or thermal sensitive adhesive.

The first polarizing layer 120 can solely form a polarizer main body, or cooperatively form the polarizer main body with at least one of the protective layer 150 and the adhesive layer 160. The transparent conductive layer 122 can be arranged on a surface of the polarizer main body, or inserted into the polarizer main body.

In one embodiment, the polarizer 12 includes two protective layers 150 respectively attached to the surface of the transparent conductive layer 122 and the surface of the first polarizing layer 120, to sandwich the transparent conductive layer 122 and the first polarizing layer 120 between the two protective layers 150. The transparent conductive layer 122 and the first polarizing layer 120 are located between the two protective layers 150. The adhesive layer 160 is arranged on the surface of the protective layer 150 which is near to the transparent conductive layer 122.

Figure 6:
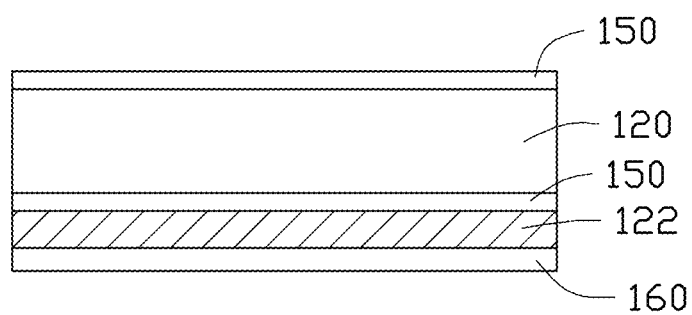
FIG. 6 is a side view of yet another embodiment of a polarizer.

Referring to FIG. 6, in another embodiment, the polarizer 12 includes two protective layers 150 respectively attached to the two surfaces of the first polarizing layer 120, to sandwich the first polarizing layer 120 between the two protective layers 150. The first polarizing layer 120 is located between the two protective layers 150. The transparent conductive layer 122 is arranged on the outer surface of one of the two protective layers 150. The one of the two protective layers 150 is located between the transparent conductive layer 122 and the first polarizing layer 120. The adhesive layer 160 is arranged on the outer surface of the transparent conductive layer 122, to sandwich the transparent conductive layer 122 between the adhesive layer 160 and the protective layer 150.

Figure 7:
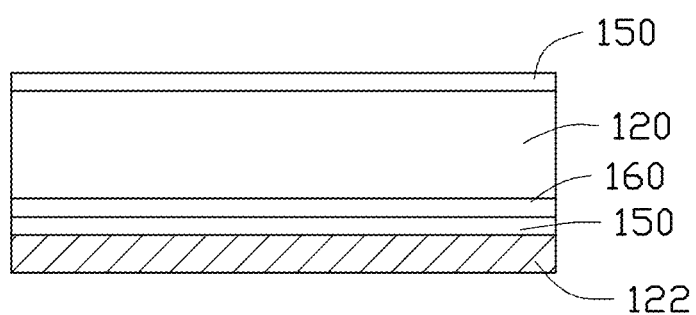
FIG. 7 is a side view of yet another embodiment of a polarizer.

Referring to FIG. 7, in yet another embodiment, the polarizer 12 includes two protective layers 150 respectively attached to the two surfaces of the first polarizing layer 120, to sandwich the first polarizing layer 120 between the two protective layers 150. The adhesive layer 160 is arranged on the outer surface of one of the two protective layers 150. The transparent conductive layer 122 is arranged on the outer surface of the adhesive layer 160, to sandwich the adhesive layer 160 between the transparent conductive layer 122 and the protective layer 150.

In the above described embodiments, the transparent conductive layer 122 can be the freestanding carbon nanotube film. The freestanding carbon nanotube film can be formed independently from the other parts of the polarizer 12, and further attached to the needing surface in the polarizer 12.

Referring back to FIG. 1, the liquid crystal module 14 is disposed on the surface of transparent conductive layer 122 away from the first polarizing layer 120. The liquid crystal module 14 includes an upper substrate 141, an upper electrode layer 142, a first alignment layer 143, a liquid crystal layer 144, a second alignment layer 145, a thin film transistor panel 146, and a second polarizing layer 147 stacked in sequences.

The upper substrate 141 can be a transparent plate. The upper substrate 141 can be made of glass, quartz, diamond, plastic or resin. A thickness of the upper substrate 141 can range from about 1 millimeter to about 1 centimeter. In one embodiment, the upper substrate 141 is a PET film and the thickness of the upper substrate 141 is about 2 millimeters.

The upper electrode layer 142 can include conductive materials, such as metals, ITO, ATO (tin antimony oxide), conductive polymer materials, or carbon nanotubes.

The first alignment layer 143 can include a plurality of substantially parallel first grooves (not shown) located on a lower surface of the first alignment layer 143. The second alignment layer 145 can include a plurality of substantially parallel second grooves (not shown) located on an upper surface of the second alignment layer 145. An alignment direction of the first grooves is substantially perpendicular to an alignment direction of the second grooves. Therefore, the alignment direction of the liquid crystal molecules differ by about 90 degrees between the first alignment layer 143 and the second alignment layer 145, which play a role in shifting the light beams by 90 degrees.

A material of the first alignment layer 143 and the second alignment layer 145 can be polystyrenes and derivatives of the polystyrenes, polyimides, polyvinyl alcohols, polyesters, epoxy resins, polyurethanes, or other polysilanes. The first grooves and the second grooves can be formed by a rubbing method, a tilt deposition method, a micro-grooves treatment method, or a SiOx-depositing method. In one embodiment, the material of the first alignment layer 143 and the second alignment layer 145 is polyimide and a thickness thereof ranges from about 1 micrometer to about 50 micrometers.

The liquid crystal layer 144 includes a plurality of oval shaped liquid crystal molecules. Understandably, the liquid crystal layer 144 can also be made of other conventional suitable materials, such as alkyl benzoic acid, alkyl cyclohexyl acid, alkyl cyclohexyl-phenol, and phenyl cyclohexane. A thickness of the liquid crystal layer 144 ranges from about 1 micrometer to about 50 micrometers. In one embodiment, the thickness of the liquid crystal layer 144 is about 5 micrometers.

The detailed structure of the thin film transistor panel 146 is not shown in FIG. 1. It is to be understood that the thin film transistor panel 146 can further include a transparent base, a number of thin film transistors located on the transparent base, a number of pixel electrodes, and a display driver circuit (not shown). The thin film transistors correspond to the pixel electrodes in a one-to-one manner. The thin film transistors are connected to the display driver circuit by the source lines and gate lines. The pixel electrodes are controlled to cooperate with the upper electrode layer 142 to apply a voltage to the liquid crystal layer 144. The pixel electrodes correspond to a touch region 126.

The second polarizing layer 147 can cooperate with the first polarizing layer 120 to control light extraction intensity of the liquid crystal module 14. Materials of the first polarizing layer 120 and the second polarizing layer 147 can be the same. A polarizing direction of the second polarizing layer 147 can be substantially perpendicular to the polarizing direction of the first polarizing layer 120.

In one embodiment, the first polarizing layer 120 can be disposed on and directly contact the surface of the upper substrate 141 away from the second polarizing layer 147 to form the liquid crystal display module 10. In other words, in the liquid crystal display module 10, the first polarizing layer 120 can be disposed between the transparent conductive layer 122 and the upper substrate 141.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A liquid crystal display module comprising:
   a liquid crystal module comprising an upper substrate, an upper electrode layer, a first alignment layer, a liquid crystal layer, a second alignment layer, a thin film transistor panel, and a second polarizing layer stacked in sequence; and
   a polarizer located on the upper substrate, the polarizer having touch sensing capability, the polarizer comprising:
   a first polarizing layer located on the upper substrate;
   a transparent conductive layer stacked with the first polarizing layer, the transparent conductive layer being an anisotropic impedance layer having a relatively low impedance direction, an electrical conductivity of the anisotropic impedance layer on the relatively low impedance direction being greater than electrical conductivities of the anisotropic impedance layer on other directions; and
   at least two driving-sensing electrodes being spaced from each other and electrically connected with the transparent conductive layer;
   wherein a polarizing direction of the first polarizing layer is substantially parallel to the relatively low impedance direction.

2. The liquid crystal display module of claim 1, wherein the polarizer is an integral structure capable of being independently installed to the liquid crystal display module.

3. The liquid crystal display module of claim 1, wherein the transparent conductive layer comprises at least one carbon nanotube film, and a majority of carbon nanotubes in the at least one carbon nanotube film are substantially aligned along an aligned direction.

4. The liquid crystal display module of claim 3, wherein the at least one carbon nanotube film is a free-standing structure that is directly attached to a surface of the first polarizing layer.

5. The liquid crystal display module of claim 3, wherein the majority of carbon nanotubes are joined end to end by van der Waals attractive force therebetween.

6. The liquid crystal display module of claim 3, wherein the majority of carbon nanotubes are substantially parallel to a surface of the first polarizing layer.

7. The liquid crystal display module of claim 3, wherein a polarizing direction of the first polarizing layer is parallel to the aligned direction of the majority of carbon nanotubes.

8. The liquid crystal display module of claim 1, wherein the transparent conductive layer comprises a carbon nanotube composite film, the carbon nanotube composite film comprises at least one carbon nanotube film and a polymer material infiltrating the at least one carbon nanotube film, and a majority of carbon nanotubes in the at least one carbon nanotube film are substantially aligned along a same direction.

9. The liquid crystal display module of claim 1, wherein the polarizer comprises four driving-sensing electrodes spaced from each other, the transparent conductive layer is square shaped having four sides, each of the four sides is electrically connected with one of the four driving-sensing electrodes.

10. The liquid crystal display module of claim 1, wherein the transparent conductive layer consists of carbon nanotubes.

11. The liquid crystal display module of claim 1, wherein the polarizer further comprises a protective layer disposed between the first polarizing layer and the transparent conductive layer.

12. The liquid crystal display module of claim 11, wherein the polarizer further comprises an adhesive layer disposed on a surface of the transparent conductive layer away from the first polarizing layer.

13. The liquid crystal display module of claim 1, wherein the polarizer further comprises a protective layer disposed on a surface of the transparent conductive layer spaced from the first polarizing layer.

14. The liquid crystal display module of claim 13, wherein the polarizer further comprises an adhesive layer disposed on a surface of the protective layer away from the transparent conductive layer.

15. A liquid crystal display module comprising a liquid crystal module and a polarizer located on a surface of the liquid crystal module, the polarizer having touch sensing capability, the polarizer comprising:
a polarizing layer;
a transparent conductive layer stacked with the polarizing layer, the transparent conductive layer being an anisotropic impedance layer having a relatively low impedance direction, an electrical conductivity of the anisotropic impedance layer on the relatively low impedance direction being greater than electrical conductivities of the anisotropic impedance layer on other directions; and
at least two driving-sensing electrodes being spaced from each other and electrically connected with the transparent conductive layer;
wherein the polarizer is an integral structure capable of being independent installed to and dissembled from the liquid crystal display module, the transparent conductive layer is disposed between the polarizing layer and the liquid crystal module, and a polarizing direction of the first polarizing layer is substantially parallel to the relatively low impedance direction.

16. A liquid crystal display module comprising a liquid crystal module and a polarizer located on a surface of the liquid crystal module, the polarizer having touch sensing capability, the polarizer comprising:
a polarizing layer;
a transparent conductive layer stacked with the polarizing layer, and the transparent conductive layer being an anisotropic impedance layer having a relatively low impedance direction, an electrical conductivity of the anisotropic impedance layer on the relatively low impedance direction being greater than electrical conductivities of the anisotropic impedance layer on other directions; and
at least two driving-sensing electrodes being spaced from each other and electrically connected with the transparent conductive layer;
wherein the polarizer is an integral structure capable of being independently installed to and dissembled from the liquid crystal display module and a polarizing direction of the first polarizing layer is substantially parallel to the relatively low impedance direction.

17. The liquid crystal display module of claim 16, wherein the polarizing layer is disposed between the transparent conductive layer and the liquid crystal module.

18. The liquid crystal display module of claim 1, wherein the at least two driving-sensing electrodes directly contact the transparent conductive layer.

* * * * *